United States Patent [19]

Novak

[11] Patent Number: 5,190,197

[45] Date of Patent: Mar. 2, 1993

[54] DISPOSABLE GLOVE DISPENSER FOR A VEHICLE

[76] Inventor: Ronald J. Novak, 413 W. Houstonia, Royal Oak, Mich. 48073

[21] Appl. No.: 753,319

[22] Filed: Aug. 30, 1991

[51] Int. Cl.⁵ .............................................. B60R 7/05
[52] U.S. Cl. .................... 224/312; 224/901; 221/46
[58] Field of Search ............. 224/311, 312, 273, 901, 224/277; 248/205.2; 296/37.7, 37.8, 37.12, 97.5; 221/45, 46

[56] References Cited

U.S. PATENT DOCUMENTS

| | | | |
|---|---|---|---|
| 2,287,581 | 6/1942 | Walker | 248/694 |
| 2,564,997 | 8/1951 | Rome | 224/312 X |
| 2,655,299 | 10/1953 | Pfeifer et al. | 224/312 |
| 2,754,029 | 7/1956 | Maxcey, Jr. | 221/46 |
| 2,826,334 | 3/1958 | Musler | 221/45 |
| 3,026,999 | 10/1958 | Constantino | 224/277 |
| 3,204,762 | 9/1965 | Shanok et al. | 224/312 X |
| 4,735,317 | 4/1988 | Sussman et al. | 221/46 X |
| 4,762,258 | 8/1988 | Murphy | 224/273 |
| 4,781,409 | 11/1988 | Harbison | 224/312 X |
| 4,844,293 | 7/1989 | McLaughlin | 221/34 |
| 4,844,311 | 7/1989 | Kalen | 224/312 |
| 4,846,382 | 7/1989 | Foultner et al. | 224/42.42 |
| 4,852,783 | 8/1989 | Bryden et al. | 224/253 |
| 4,942,992 | 7/1990 | Fischer | 224/240 |
| 4,964,508 | 10/1990 | Balsley | 224/901 X |
| 4,997,105 | 3/1991 | Fischer | 221/45 |

FOREIGN PATENT DOCUMENTS 3144944 5/1983 Fed. Rep. of Germany ........ 221/46

Primary Examiner—Henry J. Recla
Assistant Examiner—Casey Jacyna
Attorney, Agent, or Firm—Charles W. Chandler

[57] ABSTRACT

A flexible dispenser for a box of disposable gloves, having an elastic strap for mounting the dispenser on the sun visor of a vehicle. The dispenser has a case formed with front and back panels. The back panel has a continuous surface of a hook and loop fastener material so that it can be attached in a separate, remote location in the vehicle, such as on the dash board, the door or the like.

2 Claims, 2 Drawing Sheets

DISPOSABLE GLOVE DISPENSER FOR A VEHICLE

BACKGROUND OF THE INVENTION

Several professions, such as morticians, dentists and police officers, use disposable plastic gloves during the course of their work. This invention is particularly focused on the problem of police officers who contact a large number of people, some of which may have a disease. One solution for protecting such officers is to require them to wear disposable gloves. It is desirable that a suitable dispenser be mounted in a vehicle in a convenient location for the officers.

The convenient dispensing of such gloves presents a problem that has been approached in the prior art. For example, U.S. Pat. No. 4,942,992 which issued Jul. 24, 1990 to Frank E. Fischer and Shayne A. Kelly, discloses a dispenser in the form of a clip mounted on the user's belt.

Vehicle-mounted dispensers for a variety of products have been disclosed in the prior art and include for example: U.S. Pat. No. 4,846,382 issued Jul. 11, 1989 to Jerry L. Foultner, U.S. Pat. No. 4,852,783 issued Aug. 1, 1989 to Norman E. Bryden, U.S. Pat. No. 4,844,293 issued Jul. 4, 1989 to David T. McLaughlin, U.S. Pat. No. 3,026,999 issued Mar. 27, 1962 to Thomas B. Constantino, U.S. Pat, No. 4,844,311 issued July 4, 1989 to Daniel A. Kalen and U.S. Pat. No. 2,287,581 issued Jun. 23, 1942 to David O. Walker.

SUMMARY OF THE INVENTION

The broad purpose of the present invention is to provide a convenient dispenser that can be mounted in a vehicle in alternative locations. The preferred embodiment of the invention comprises a case having front and back panels formed of a flexible material. The panels are stitched around their side edges, leaving an opening for receiving a box of gloves into the enclosure formed by the panels. The front panel has an opening for removing an individual glove.

A pair of elastic straps are attached to the upper and lower edges of the case so that the case can be slipped over a rigid sun visor.

The entire surface of the back panel also has a hook and loop-type fabric fastener means which can be readily attached to a complementary strip of a fabric-type fastener means mounted in another suitable location in the vehicle, such as under the dash board, behind a seat, on the door, or the like.

Still further objects and advantages of the invention will become readily apparent to those skilled in the art to which the invention pertains upon reference to the following detailed description.

DESCRIPTION OF THE DRAWING

The drawing refers to the accompanying views in which like reference characters refer to like parts throughout the several views, and in which.

DESCRIPTION OF THE PREFERRED EMBODIMENT

Figure 1:
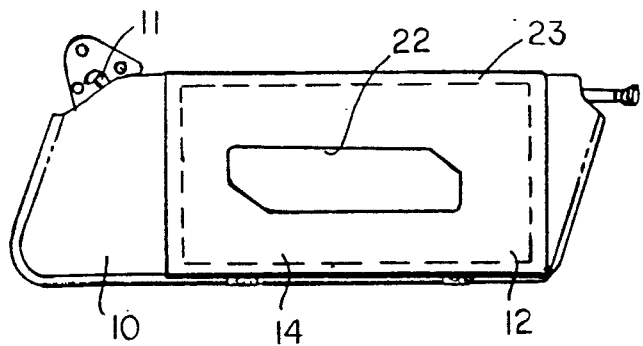
FIG. 1 is a view illustrating a preferred dispenser mounted on the sun visor of a motor vehicle.

Referring to the drawing, FIG. 1 illustrates the interior of a conventional motor vehicle having a sun visor 10. Sun visor 10 is conventional having a generally rectangular, elongated configuration formed of a stiff material. The sun visor is supported by a pivot means 11 connected to the vehicle interior.

A preferred dispenser 12 is mounted on the sun visor. Dispenser 12 comprises a case formed of a flexible fabric or plastic material, that includes a front panel 14 illustrated in FIG. 1 and a rear panel 16 illustrated in FIG. 4. The front panel has a generally rectangular configuration and is longer than the rear panel. The top and bottom edges, as well as the edges along the right side of the two panels, are attached together by suitable means such as by stitching, to leave an opening 18 along the left edges of the two panels. The front panel 14 is longer than the rear panel 16 so as to form a foldable flap 20 adjacent opening 18. A strip of hook and loop fastener means 21, such as a Velcro fabric fastener, is attached to the inside surface of flap 20 so that it can be folded over and connected to the rear panel 16.

The front panel has an opening 22 for removing an individual glove from a box 23 disposed in the enclosure formed by the front and rear panels.

Figure 4:
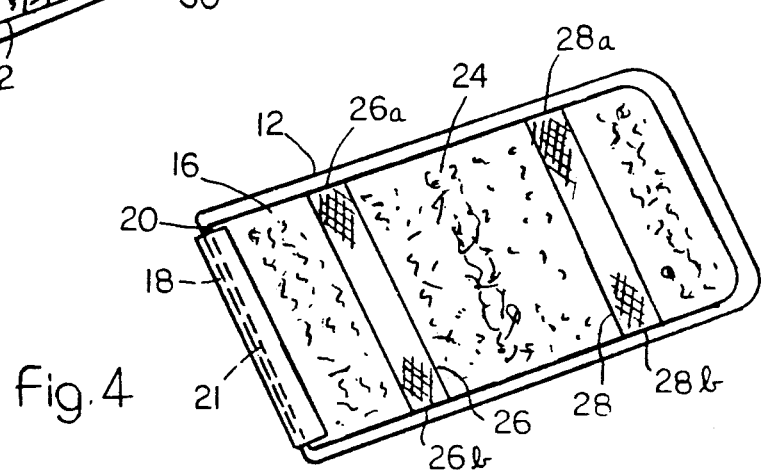
FIG. 4 is a view of the backside of the preferred dispenser to illustrate both the straps as well as the fabric fastener means.
Figure 5:
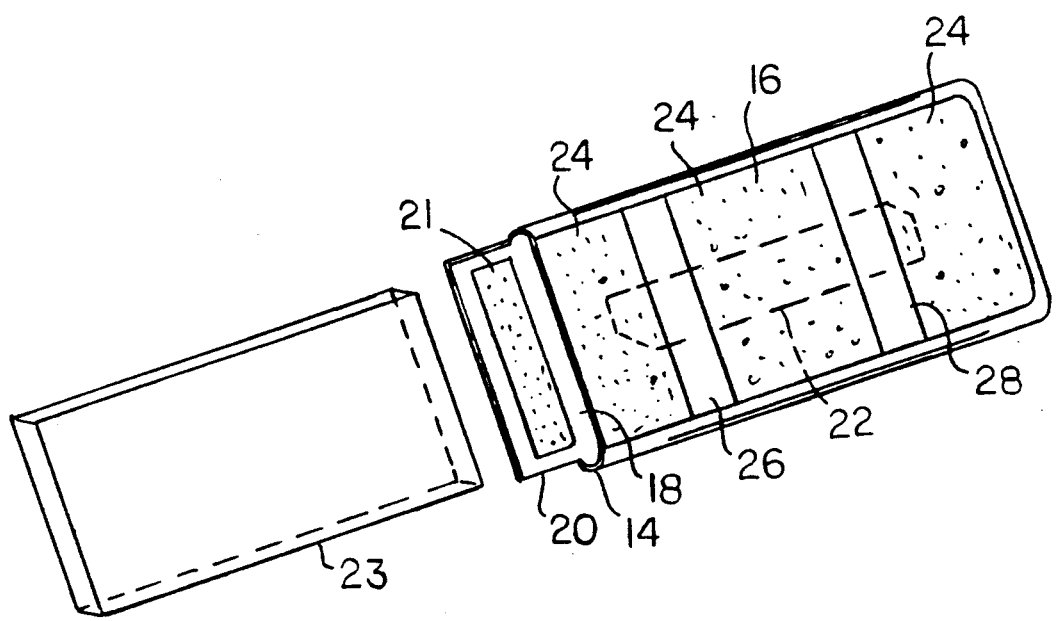
FIG. 5 is a perspective view of the FIG. 1 dispenser, with a flap closure thereof opened to permit insertion of a box of gloves in the dispenser interior space.

Referring to FIG. 4, the entire rear surface of the back panel is formed with a continuous surface 24 of a hook and loop-type fastener means, such as a Velcro fastener. Fastener means 24 is complementary with fastener strip 20 so that the flap can be folded over and retained in place to close opening 18.

The size of the dispenser is chosen to accommodate the size of the box of disposable gloves, as well as the dimensions of the sun visor.

Figure 2:
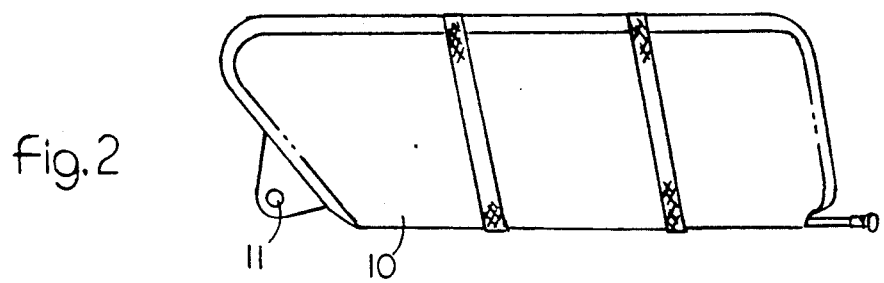
FIG. 2 is a view of the backside of the sun visor showing the mounting strap.

A pair of elastic straps 26 and 28 are mounted adjacent the rear panel. The opposite ends of the two straps are attached as at 26a and 28a adjacent the seam formed along the top of the two panels. The lower ends of the straps are attached as at 26b and 28b to the lower seam of the two panels. The straps have a length chosen so that they resiliently receive the sun visor between the straps and the back panel so that the dispenser is mounted as illustrated in FIGS. 1 and 2.

Figure 3:
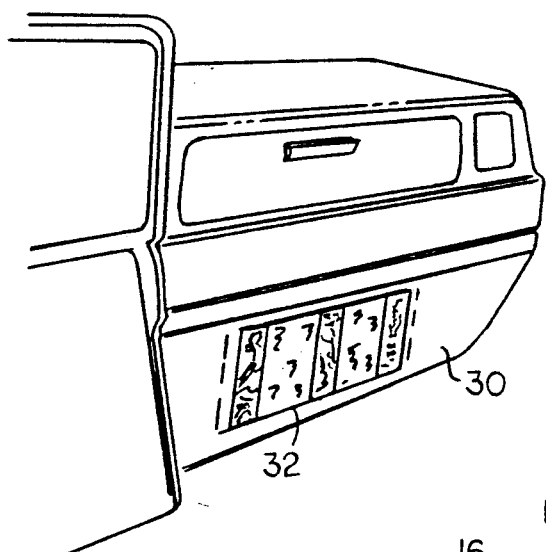
FIG. 3 is a view of the underside of the dash board to show a complementary strip of a hook and loop fastener.

FIG. 3 shows the lower side 30 of the vehicle's dash board. Patch 32 of a hook and loop-type fastener, such as a Velcro fabric fastener, is attached to the dash to receive the back panel of the dispenser. It is to be noted that straps 26 and 28 are relatively thin and patch 32 is sufficiently large so that the back panel of the dispenser can be attached and located in a selected position of the dash board. That is to say that the width of patch 32 is substantially larger than the width of the straps. Thus the back panel can be mounted with patch 32 overlapping one or both of the elastic straps.

It is to be understood that I have described an improved dispenser for a box of disposable gloves that can be mounted in alternative positions in a vehicle, such as on a sun visor, under the dash board or wherever it may be convenient for the particular person using the vehicle.

Having described my invention, I claim:

1. In a vehicle having a rigid sun visor and other interior structures: the improvement comprising a dispenser for protective disposable gloves contained within a rectangular box (23); said dispenser comprising a case formed of a flexible material; said case comprising a flexible front panel (14) and a flexible rear panel (16); each panel having a relatively long upper edge, a relatively long lower edge, and first and second relatively short side edges; said front panel being longer than said rear panel in a direction taken parallel to the upper and lower panel edges, whereby the edge area of the front panel at its first side edge forms a flexible flap; said front and rear panels being connected together along their respective upper edges, lower edges, and second side edges; said flap being disconnected from the first side edge of the rear panel, whereby a slot-like opening is formed for slidable insertion of a box of disposable gloves into said case; said rear panel having an exterior surface comprised at least partly of hook and loop fastener material; said flap having an interior surface formed of hook and loop fastener material; said flap having an interior surface formed of hook and loop fastener material, whereby said flap can be folded to extend across the box insertion opening, with its hook and loop interior surface attached to the hook and loop surface of said rear panel; two resilient straps extending along the exterior surface of said rear panel in spaced apart relation, each resilient strap having one end thereof attached to the upper edge of the rear panel and the other end thereof attached to the lower edge of the rear panel; each resilient strap lying flat against the exterior surface of said rear panel in its unstressed condition; each strap being stretchable in the direction of its length, whereby the straps can be manipulated so that the vehicle sun visor is sandwiched between the straps and the case rear panel; said front panel having a dispenser opening (22) for manual withdrawal of gloves from the aforementioned box; said rear panel having exposed hook and loop surface areas located in the spaced defined between the rear panel side edges and the straps; and a patch means (32) mountable on an interior structure of the vehicle remote from the sun visor; said patch means having an exterior surface formed of hook and loop fastener material; said patch means being of sufficient size so that its hook and loop fastener surface can mate with the exposed hook and surface areas of said rear panel, whereby the dispenser case can be detachably mounted on the aforementioned vehicle interior surface.

2. The improvement of claim 1, wherein said rear panel is formed entirely of a single sheet of hook and loop fastener material.

* * * * *